United States Patent
Johnston et al.

(10) Patent No.: US 12,522,530 B2
(45) Date of Patent: Jan. 13, 2026

(54) MOLTEN GLASS GOB DELIVERY GUIDE

(71) Applicant: Owens-Brockway Glass Container Inc., Perrysburg, OH (US)

(72) Inventors: Karl Johnston, Perrysburg, OH (US); Peter Severson, Monclova, OH (US)

(73) Assignee: Owens-Brockway Glass Container Inc., Perrysburg, OH (US)

( * ) Notice: Subject to any disclaimer, the term of this patent is extended or adjusted under 35 U.S.C. 154(b) by 68 days.

(21) Appl. No.: 18/455,199

(22) Filed: Aug. 24, 2023

(65) Prior Publication Data
US 2025/0066235 A1    Feb. 27, 2025

(51) Int. Cl.
C03B 7/082    (2006.01)
C03B 7/088    (2006.01)
C03B 7/14    (2006.01)

(52) U.S. Cl.
CPC ............. *C03B 7/082* (2013.01); *C03B 7/088* (2013.01); *C03B 7/14* (2013.01)

(58) Field of Classification Search
CPC .................................. C03B 7/082; C03B 7/14
See application file for complete search history.

(56) References Cited

U.S. PATENT DOCUMENTS

| | | | |
|---|---|---|---|
| 3,650,723 A * | 3/1972 | Wiley | C03B 7/16 65/169 |
| 3,655,354 A * | 4/1972 | Quandt | C03B 5/1672 23/301 |
| 3,961,927 A | 6/1976 | Alderson et al. | |
| 5,394,910 A | 3/1995 | Sweetland | |
| 6,776,011 B2 | 8/2004 | Hayes et al. | |
| 2004/0182112 A1 * | 9/2004 | Hosoe | C03B 19/1055 65/29.21 |
| 2022/0024799 A1 | 1/2022 | Moriuchi et al. | |

(Continued)

FOREIGN PATENT DOCUMENTS

| | | |
|---|---|---|
| DE | 2852406 A1 | 7/1980 |
| DE | 19643108 A1 | 4/1998 |
| JP | S63236718 A | 10/1988 |

(Continued)

OTHER PUBLICATIONS

SGL Carbon "Everything about Graphite" https://www.sglcarbon.com/en/everything-about-graphite/ Accessed Jan. 25, 2025 (Year: 2025).*

(Continued)

*Primary Examiner* — Cynthia Szewczyk

(57) ABSTRACT

A molten glass gob delivery guide is disclosed that includes a chute having an upstream end, a downstream end, a rear surface, and a front surface. The chute is comprised of a gas permeable material and is able to accommodate the permeable flow of a permeating gas from the rear surface to the front surface of the chute. When a molten glass gob is conveyed along the chute over the front surface of the chute, the permeating gas flows permeably through the chute to establish a gas cushion that displaces the glass gob away from the front surface of the chute, which creates a thermal break between the glass gob and the chute. In this way, heat loss from the molten glass gob to the chute can be minimized as the gob travels along the chute.

16 Claims, 2 Drawing Sheets

(56) References Cited

U.S. PATENT DOCUMENTS

2023/0271869 A1    8/2023   Graff et al.
2023/0271870 A1    8/2023   Graff et al.

FOREIGN PATENT DOCUMENTS

| JP | 4537281 | B2 | 9/2010 |
| JP | 4671856 | B2 | 4/2011 |
| WO | 2023164138 | A1 | 8/2023 |

OTHER PUBLICATIONS

Translation of JP 63-236718 (Year: 1988).*
Unacademy, "Properties of Graphite", https://unacademy.com/content/jee/study-material/chemistry/properties-of-graphite/ Accessed Jan. 25, 2025 (Year: 2025).*
PCT International Search Report and Written Opinion, Application No. PCT/US2024/037548, dated Oct. 7, 2024.

* cited by examiner

MOLTEN GLASS GOB DELIVERY GUIDE

TECHNICAL FIELD

This application relates to apparatuses and methods for glass container manufacturing and, more particularly, apparatuses and methods for delivering molten glass to forming equipment.

BACKGROUND

Glass container manufacturing processes typically include the following general process steps: (a) melting raw materials in a glass furnace or melter to produce molten glass; (b) producing a discrete portion or charge of the molten glass, typically referred to as a "gob," by flowing a stream of the molten glass out of a glass feeder and cutting the stream with shears to produce the molten glass gob; (c) delivering the molten glass gob to a blank mold of a glass container forming machine that forms the molten glass gob into a "parison" or a partially-formed container; (d) opening the blank mold and transferring the parison to a blow mold of the glass container forming machine; and (e) blowing the parison against internal walls of the blow mold to form a glass container. In conventional processes, the molten glass gobs are delivered from the glass feeder to their respective blank molds by gob delivery equipment that includes a lengthy and widespread series of metal-based scoops, troughs, and deflectors that rely on gravity to propel the gobs through the system.

Conventional gob delivery equipment is quite useful and dependable in many circumstances. However, conventional gob delivery equipment imparts some asymmetric thermal and shape distortion to the gob. More specifically, as the glass gob travels along lubricated metal-based delivery components, the longitudinal surface portion of the gob that is in sliding contact with the delivery components loses heat to those components and, as a result, becomes colder and stiffer than the rest of the surface of the gob. As such, the glass gob typically exhibits an inhomogeneous temperature profile around its circumference when it is delivered to the blank mold and may also have a varying shape due to being non-uniformly elongated along the delivery system components. For these reasons, the molten glass gob usually deforms and flows irregularly within the blank mold when being formed into a parison, which can lead to glass containers having an inconsistent wall thickness. The amount of glass included in each molten glass gob is engineered to account for this wall thickness disparity; that is, extra glass is included in the glass gob so the even the thinnest portion of the glass container wall will meet or exceed a minimum threshold thickness, even though other portions of the container wall may be much thicker than necessary. If this distortion in glass wall thickness did not occur, the weight of the container could be reduced, without reducing minimum glass wall thickness specifications, since the reduction would serve to remove excess glass.

SUMMARY OF THE DISCLOSURE

In one implementation of the present disclosure, a molten glass gob delivery guide includes a chute and a rear wall coupled to the chute to define a fluid chamber between the chute and the rear wall. The chute has an upstream end, a downstream end spaced apart from the upstream end, a rear surface, and a front surface. The chute is comprised of a gas permeable material that is thermally conductive and has a permeability of at least 50 md and a melting point of at least 400° C. In another implementation of the present disclosure, a molten glass delivery guide includes a chute and a rear wall coupled to the chute to define a fluid chamber between the chute and the rear wall. The chute has an upstream end, a downstream end spaced apart from the upstream end, a rear surface, and a front surface. The chute is comprised of a gas permeable graphite-based material that has a permeability of at least 50.

In yet another implementation of the present disclosure, a method of conveying a molten glass gob includes receiving a molten glass gob on a front surface of a chute extending between an upstream end of the chute and a downstream end of the chute, conveying the glass gob along the chute within an open channel defined by the chute, and flowing a permeating gas permeably through the chute to create a gas cushion that displaces the glass gob away from the chute as the gob is being conveyed along the chute from the upstream end towards the downstream end of the chute.

In still another implementation of the present disclosure, a method of delivering a molten glass gob from a glass feeder, for example, to a blank mold of a glass forming machine includes forming a molten glass gob at the glass feeder, receiving the molten glass gob on a molten glass gob delivery track that establishes a gob travel path from the glass feeder to the blank mold, and conveying the glass gob along the track to the blank mold. Here, in this method, the molten glass gob delivery track includes a molten glass gob delivery guide having a chute. The chute defines an open channel and includes a front surface and a rear surface. As the molten glass gob is conveyed along the chute, the gob is received onto the chute within the open channel and is conveyed along the guide over the front surface of the chute. The method further includes supplying a permeating gas to the rear surface of the chute. The permeating gas flows permeably through the chute from the rear surface to the front surface and creates the gas cushion, which displaces the molten glass gob away from the front surface.

DETAILED DESCRIPTION

The present disclosure describes a molten glass gob delivery guide that is used to convey a molten glass gob at least partially through a gob delivery track extending from one location, e.g., from beneath a glass feeder, to another location, e.g., to above a blank mold of a glass container forming machine. The portion of the delivery guide that receives and confronts the molten glass gob is constructed from a material that is gas permeable so that gas permeating through the material can establish a gas cushion that lifts the gob away from the guide and disrupts heat transfer between the gob and the guide as the gob travels along the guide. The delivery guide thus helps improve the thermal homogeneity of the molten glass gob that is ultimately conveyed along the guide and delivered downstream. In practice, for example, when one or more of the delivery guides are employed as all or part of the gob delivery track that feeds a blank mold, the delivery of a more thermally homogeneous glass gob to the blank mold, as compared to traditional delivery equipment, helps produce a glass container with a more consistent wall thickness since a more thermally homogeneous glass gob will deform and flow more consistently within the blank mold. The ability to reliably achieve a more consistent container wall thickness, in turn, provides an opportunity to minimize excess glass weight within the glass container.

Figure 1:
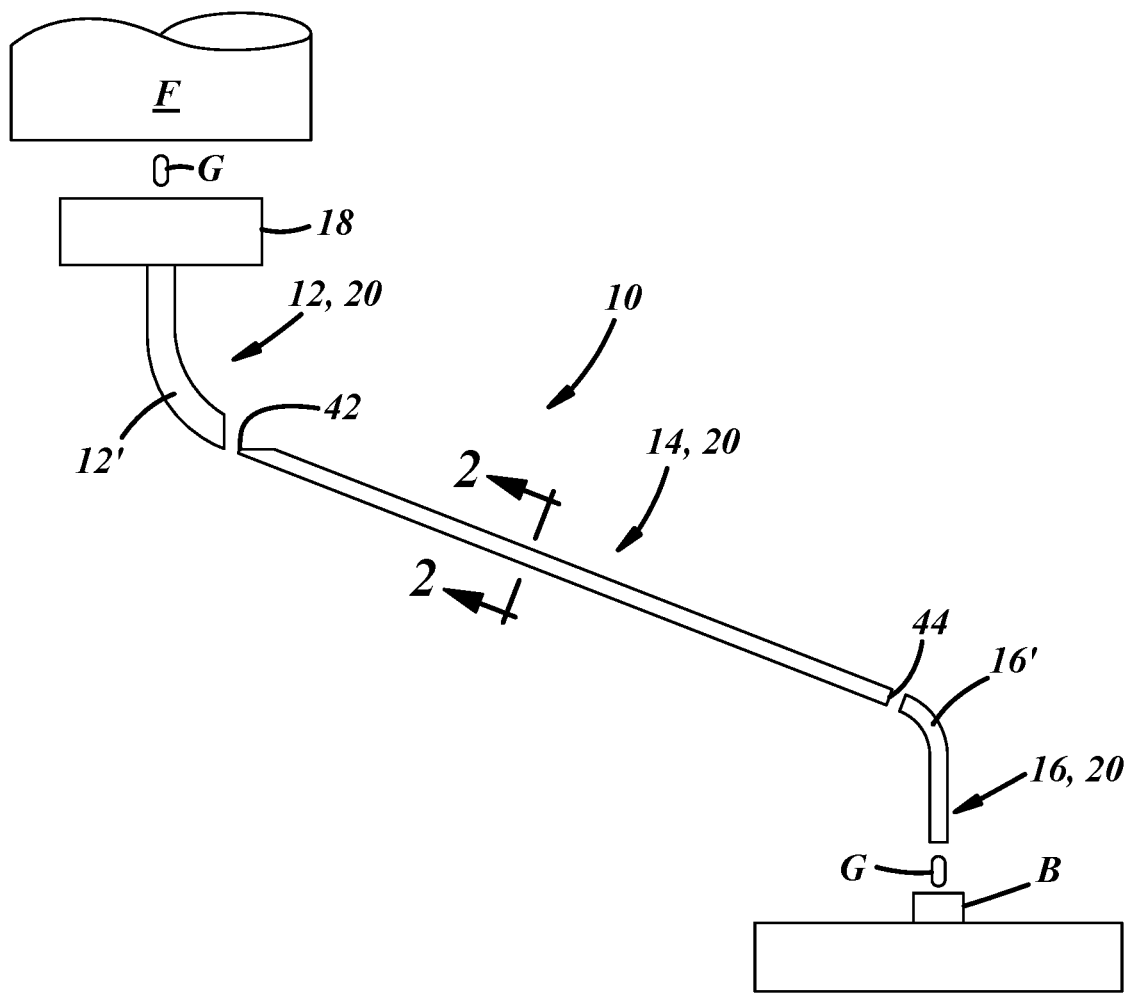
FIG. 1 is a schematic view of a molten glass gob delivery track in accordance with an illustrative embodiment of the present disclosure, illustrating one or more molten glass gob delivery guides that may be comprised of a gas permeable material.

Turning now to the drawings, and in accordance with one embodiment of the present disclosure, FIG. 1 depicts molten glass gob delivery track 10 that includes one or more gob delivery guides that, together, establish a gob travel path from an overhead gob feeder F to a blank mold B of a glass container forming machine. The gob feeder F produces a molten glass gob G that is received by the molten glass gob delivery track 10, conveyed by the molten glass track 10 along the gob travel path, and ultimately delivered from the track 10 to the blank mold B. Although not separately illustrated, the glass feeder F may include one or more feeder orifices that dispense molten glass streams and one or more shears, lasers, or the like that separate the molten glass streams into the discrete molten glass gobs G that are provided to the track 10. Additionally, the glass container forming machine may include a blow mold (not shown) in addition to the blank mold B. In operation, the blank mold B receives the molten glass gob G and forms the gob G into a partially-formed container, commonly known as a "parison," which is then transferred to the blow mold where the parison is blown with a compressed gas into the finished glass container.

The one or more gob delivery guides of the glass gob delivery track 10 may include a distributor scoop 12, a trough 14, and a gob deflector 16. The distributor scoop 12 receives the molten glass gob G from the glass feeder F, typically via an intervening guide funnel, and conveys the gob G downstream to the trough 14. The distributor scoop 12 typically includes a curved portion, as shown, and may be rotatably driven by a distributor actuator 18 so that the same distributor scoop 12 can moved between multiple trough and deflector runs, each corresponding to a separate blank mold B, and thus form part of multiple gob delivery tracks 10. The trough 14 receives the molten glass gob G from the distributor scoop 12 and conveys the gob G downstream towards or to the gob deflector 16. The trough 14 is typically straight and is arranged to have a downward slope between the distributor 12 and the deflector 16 to help convey the gob G. The gob deflector 16 receives the glass gob G from the trough 14 and delivers the gob G to the blank mold B. The gob deflector 16 includes a curved portion, as shown, so that the glass gob G can be loaded into the blank mold B along a vertical feed path.

Figure 2:
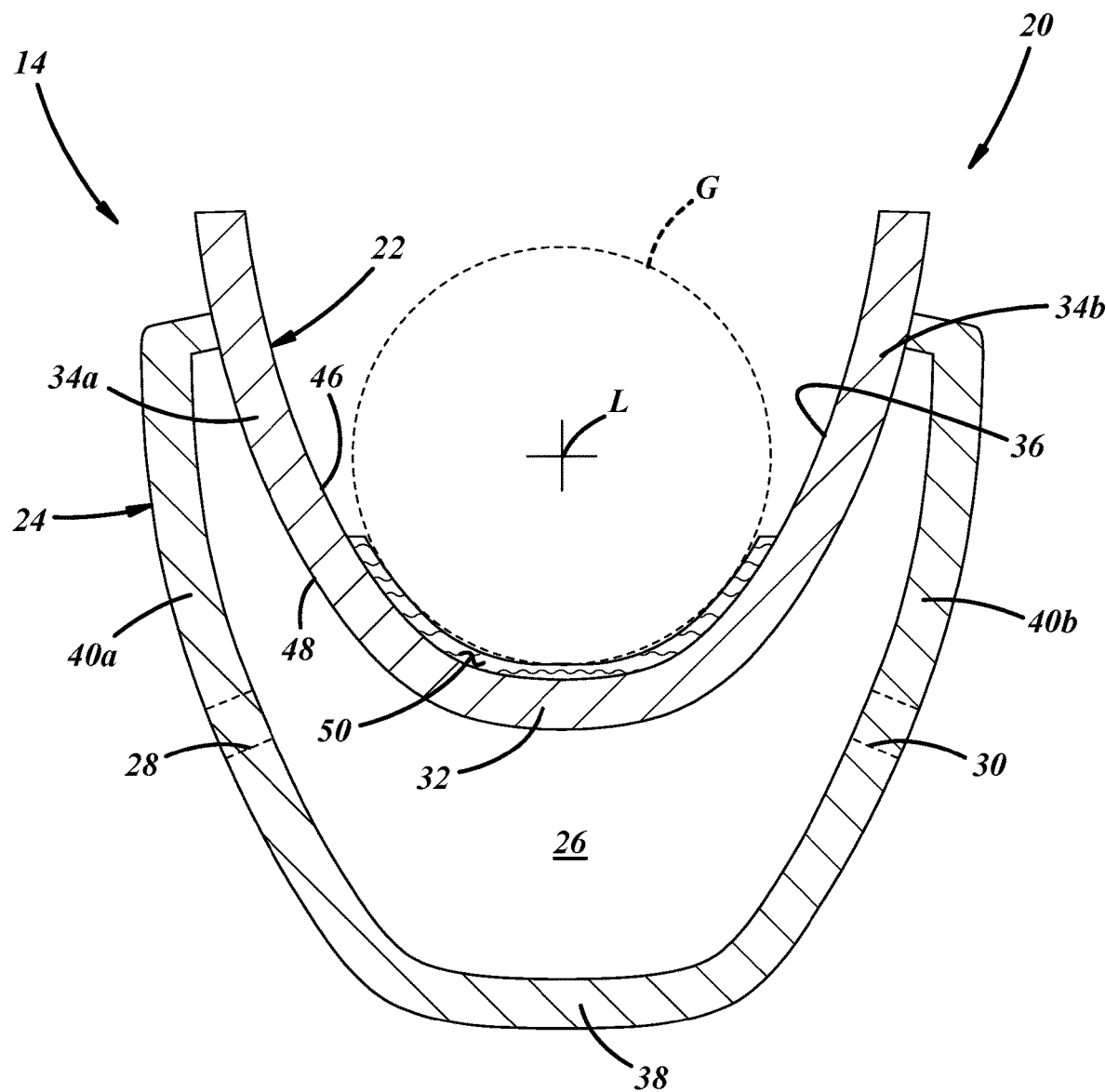
FIG. 2 is a cross-sectional perspective view of the molten glass gob delivery guide depicted in FIG. 1.

A molten glass gob delivery guide 20 is described herein—the guide 20 being described more specifically below using the trough 14 as a representative example—and may be configured and deployed within the track 10 as at least one of the distributor scoop 12, the trough 14, or the gob deflector 16, and may even be configured and deployed as any combination of those components or all of those components. Accordingly, while the molten glass gob delivery guide 20 is described below in the context of the trough 14 illustrated in FIG. 1, the guide 20 may just as easily be deployed as the distributor scoop 12 or the gob deflector 16 and the same general construction, use, and function will apply. With reference now to FIG. 2, the molten glass delivery guide 20 in the form of the trough 14 is illustrated in cross-section, taken along line 2-2 of FIG. 1, perpendicular or normal with respect to a longitudinal axis L of the trough 14. The molten glass delivery guide 20 includes a chute 22 and a rear wall 24. The chute 22 and the rear wall 24 are coupled together to define a fluid chamber 26 between the chute 22 and the rear wall 24 that contains an overpressured permeating gas such as, for example, air, oxygen, nitrogen, or any other gas suitable for contact with molten glass. The fluid chamber 26 may be supplied with the permeating gas through a fluid inlet 28, which is defined in the rear wall 24, and is typically pressurized to a pressure ranging from 1 psig to 100 psig. An optional fluid outlet 30 may also be defined in the rear wall 24 to relieve pressure in the fluid chamber 26 while acting, for example, as a pressure relief vent. The permeating gas may be supplied from a vessel pressurized with the gas or a gas line pressurized by a pump, for instance, and the flow rate of the permeating gas into the fluid chamber 26 may be controlled by one or more valves such as proportional valves.

The chute 22 includes a base 32 and opposed lateral sidewalls 34a, 34b extending away from the base 32. The base 32 and the sidewalls 34a, 34b define an open channel 36, which, in the context of the trough 14, extends along the longitudinal axis L of the trough 14. Here, the chute 20 is illustrated as being U-shaped in normal cross-section, although other similar cross-sectional profiles may be employed. The rear wall 24 may be constructed similarly to the chute 22 and, for example, may include a base 38 and opposed lateral sidewalls 40a, 40b extending away from the base 38. The rear wall 24 is shown here as being U-shaped in normal cross-section although other cross-sectional profiles are certainly possible. The base 32 of the chute 22 may be received between the opposed lateral sidewalls 40a, 40b of the rear wall 24 and the opposed lateral sidewalls 40a, 40b of the rear wall 24 may be coupled to the opposed lateral sidewalls 34a, 34b of the chute 22 to establish the fluid chamber 26. The chute 22 and the rear wall 24 may be coupled together via their opposed lateral sidewalls 34a, 34b, 40a, 40b, for example, by fasteners, crimping, an adhesive, or any other coupling technique suitable for glass gob delivery equipment. As for the normal cross-sectional view of the guide 20 illustrated here in FIG. 2 in the context of the trough 14, a similar normal cross-sectional view would also apply if the guide 20 is employed as the distributor scoop 12 or the gob deflector 16, although the orientations of those views may vary, particularly for the deflector 16, which would appear as upside-down or inverted compared to the trough 14 when viewed from the same perspective.

The chute 22 receives the molten glass gob G and guides the gob G along the guide 20. In that regard, the chute 22 has a first or upstream end 42, a second or downstream end 44 spaced apart from the upstream end 44, a front surface 46 that delineates the open channel 36, and a rear surface 48 that is at least partially encapsulated by the rear wall 24. In operation as part of the glass gob delivery track 10, the molten glass gob G is conveyed along the chute 22 from the upstream end 42, where the gob G is received onto the guide 20, to the downstream end 44, where the gob G is delivered from the guide 20, within the open channel 36 over the front surface 46. The rear surface 48 of the chute 22 that is encapsulated by the rear wall 24 is exposed to the pressurized permeating gas contained in the fluid chamber 26. As explained in greater detail below, the pressurized permeating gas permeates through the chute 22 from the rear surface 48 to the front surface 46, which creates a transient gas cushion 50 between the front surface 46 of the chute 22 and the molten glass gob G. For the purpose of aiding the description, the gas cushion 50 shown in FIG. 2 is depicted in idealized fashion and not necessarily to scale.

The chute 20 is comprised of a gas permeable material. The material is "gas permeable" in the sense that the permeating gas can diffusively flow through the interstitial porosity of the microstructure of the material when a pressure drop across the material exists. The material properties of the gas permeable material and the pressure of the permeating gas within the fluid chamber 26 can be tailored to help ensure that the permeating gas can flow permeably through the chute 22 with enough flux to establish the gas cushion 50 between the glass gob G and the chute 22. The established gas cushion 50 is transient and displaces the glass gob G away from the front surface 46 of the chute 22, thus creating a thermal break between the gob G and the chute 22, as the gob G travels along the chute 22 from the upstream end 42 to the downstream end 44. The molten glass gob G essentially glides over the front surface 46 on the gas cushion 50 as the gob G travels along the chute 22 such that sustained direct sliding contact between the gob G and the front surface 46 of the chute 22 is avoided, although the gob G may occasionally make contact with the front surface 46, for example, when being loaded onto the chute 22, when being unloaded from the chute 22, or intermittently when being conveyed along the chute 22. Again, to reiterate, the gas cushion 50 described herein is established by gas flowing permeably through the natural interstitial pores of the microstructure of the gas permeable material from which the chute 22 is comprised. The gas cushion 50 is not established solely by discrete concentrations of gas flowing non-permeably through defined holes or passages (e.g., a pattern of machined holes or slots) since such gas flow is not distributed nearly as uniformly as permeable gas flow.

The gas cushion 50 beneficially impacts the function of the molten glass gob delivery guide 20 is several ways. First, the gas cushion 50 displaces the glass gob G away from the front surface 46 of the chute 22 so that the initial heat content of the glass gob G is preserved as much as possible by curtailing heat loss from the gob G to the chute 22, via the established thermal break, when the gob G is traveling down the chute 22 within the open channel 36. By disrupting heat loss from the glass gob G to the chute 22, the glass gob G is more thermally insulated and the formation of temperature variances within and on the surface of the gob G during conveyance along the chute 22—particularly the formation of surface temperature variations axially along and semi-circumferentially around the gob G that result from sustained direct sliding contact—can be minimized. Second, the gas cushion 50 helps to self-center the glass gob G within the open channel 36 of the chute 22 as the gob G is received onto the front surface 46 during loading and subsequently transported down the chute 22, which decreases the sensitivity of the process to variation in gob position and shape when loading the gob G onto the chute 22. Third, the gas cushion 50 minimizes frictional contact between the glass gob G and the front surface 46 of the chute 22, which helps alleviate glass sticking and reduces wear on the front surface 46.

When used to construct the chute 20 as part of the glass gob delivery guide 20, the gas permeable material is selected so that the permeating gas can flow permeably through the chute 20 at a sufficient flux to create the gas cushion 50 and achieve good performance in terms of mitigating heat loss from the molten glass gob G to the chute 22. The permeable flow rate through the gas permeable material of the chute 22 (for the range of thickness the chute 20 may assume) is dictated primarily by (i) the pressure differential across the gas permeable material, which, in the guide 20, is attained by controlling the pressure of the permeating gas within the fluid chamber 26 behind the chute 22, and (ii) the permeability of the material. To achieve sufficient permeable flow of the permeating gas through the chute 22, particularly at gas pressures within the fluid chamber 26 that range from 1 psig to 100 psig, the gas permeable material preferably has a permeability (k) of at least 50 millidarcy (md), at least 100 md, at least 120 md, at least 150 md, or at least 200 md, with some example permeability ranges being from 50 md to 600 md or, more narrowly, from 80 md to 500 md, from 100 md to 450 md, or from 200 md to 600 md when measured according to the ASTM D4525-13 Standard. The term "permeability" as used herein is a proportionality constant and is often used synonymously with the term "coefficient of permeability," as in the ASTM D4525-13 Standard, or the "permeability coefficient."

The exact permeability needed for the gas permeable material of the chute 22 and the corresponding pressure needed within the fluid chamber 26 to achieve sufficient permeable gas flow through the chute 22 may be different for different parts of the glass gob delivery track 10. For example, if the glass gob delivery guide 20 is vertically oriented, less permeable gas flow through the chute 22 will typically be required compared to situations where the guide 20 is oriented more horizontally. Indeed, as the angle of the glass gob delivery guide 20 is made progressively more horizontal, the flow of the permeating gas through the chute 22 will typically need to be increased since the glass gob G has to be lifted off the front surface 46 of the chute 22 against gravity. To that end, the flow of the permeating gas is a function of the permeability of the gas permeable material, the thickness of the gas permeable material, the weight and shape of the glass gob G, the temperature of the glass gob G, the speed of the glass gob G, the gob to delivery incident angle, and the density of the permeating gas. Given these variables, and for a gas permeable material that meets the minimum permeability specifications mentioned above, the pressure of the permeating gas in the fluid chamber 26 can be modulated to achieve the permeable flow of the permeating gas and the resultant gas cushion 50 that provides optimum performance for the particular application of the glass gob delivery guide 20.

In addition to permeability, the gas permeable material is also thermally conductive (i.e., the material is not an thermal insulator) and has a melting point (the point at which a material undergoes a phase transition from a solid into a liquid or gas) of at least 400° C., at least 500° C., least 700° C., or most preferably at least 1000° C. The thermal conductivity of the gas permeable material helps disseminate heat away from the front surface 46 of the chute 22 and the melting point helps ensure the material can withstand the heat of the glass gob G. Of course, in some instances and depending on the material being explored and its potential application, other factors may need to be considered, such as, for example, whether the material oxidizes, combusts, or otherwise degrades at low temperatures and the machinability of the material.

The gas permeable material may be a carbon-based material and, more preferably, a graphite-based material. As used herein, "-based" refers to materials that are greater than or equal to 50 wt % of the designated material. For example, a graphite-based material may be pure graphite (100 wt %) or a mixture having graphite as the main constituent (50 wt % or greater) along with other materials. A graphite-based material is a particularly good candidate for the gas permeable material because graphite can achieve various levels of permeability depending on several factors including how the graphite is formed and processed. Another quality of graphite-based materials that may be useful in constructing the chute 22 is that graphite-based materials are self-lubricating. When the gas permeable material is self-lubricating, the glass gob G moves with less frictional resistance against the front surface 46 of the chute 22 to the extent the gob even makes contact with the front surface 46 when being conveyed. Another option for the gas permeable material besides a carbon-based material is an additive manufactured metal having a density less than 100% of the theoretical density of the metal. For example, an additive manufactured iron or steel, which may be fabricated by 3D printing, can be manufactured to a density less than its theoretical density so that it can accommodate the permeable flow of the permeating gas unlike cast or other traditional forms of the material. Yet another option for the gas permeable material is a boron nitride-based (BN-based) material and, more particularly, hexagonal boron nitride. One or more of the aforementioned materials may also be combined together to provide the gas permeable material.

In one specific embodiment, the gas permeable material is composed of an extruded graphite. Extruded graphite can possess a relatively high permeability, including within the ranges specified above, and may also be more thermally conductive than other types of graphite. In this embodiment, the entirety of the chute 22—that is, the entire thickness between the front surface 46 and the rear surface 48—from the first or upstream end 42 to the second or downstream end 44 is composed of extruded graphite, and the chute 20 is formed from a solid extruded graphite body by machining or any other suitable manufacturing process. Constructing the chute 20 from extruded graphite may also provide some control over the porosity of the front surface 46 of the chute 22, which may help establish the desired surface roughness and permeability. One particularly useful extruded graphite that may be used to construct the chute 22 is identified as DT-585 and is available from DuraTemp Corporation (Holland, Ohio).

The rear wall 24 of the delivery guide 20 may be comprised of the gas permeable material described above and may, within the class of suitable gas permeable materials, be the same as or different from that of the chute 22. Both the chute 22 and the rear wall 24 may be comprised of a gas permeable material as described above if the pressure of the permeating gas within the fluid chamber 26 is sufficient to support an adequate permeable flow of the permeating gas through the chute 22 despite comparable permeating flow of the permeating gas through the rear wall 24 as well. Of course, the rear wall 24 does not necessarily have to be comprised of the gas permeable material and, in fact, is preferably comprised of a different material that is either less permeable to gas flow than the gas permeable material from which the chute 22 is comprised or is non-gas permeable. For example, the rear wall 24 may be composed of a non-gas permeable metal such as iron, steel, or aluminum. By not allowing or at least severely restricting permeable flow through the rear wall 24, the pressure in the fluid chamber 26 is easier to manage and the permeating gas within the fluid chamber 26 can better support the gas cushion 50.

The molten glass delivery guide 20 described above can be used to receive, convey, and deliver the molten glass gob G for subsequent glass forming operations. For example, the guide 20 may be constructed as the distributor scoop 12, the trough 14, the gob deflector 16, or any combination of two or more of those components 12, 14, 16, within the molten glass gob delivery track 10. In any of those applications, one method of using the guide 20 to convey the molten glass gob G includes receiving the glass gob G on the chute 22 and, more specifically, receiving the gob G at the upstream end 42 of the chute 22 within the open channel 36 over the front surface 46 of the chute 22, and conveying the glass gob G along the chute 22 within the open channel 36 from the upstream end 42 towards the downstream end 44 of the chute 22. The method further includes flowing a permeating gas permeably through the chute 22 from the rear surface 48 of the chute 22 to the front surface 46 to create the gas cushion 50, which displaces the glass gob G away from the front surface 46 of the chute 22 as the gob G is conveyed along the chute 22. And, as explained above, by displacing the glass gob G away from the front surface 46 of the chute 22, the gas cushion 50 creates a thermal break between the glass gob G and the front surface 46. This thermal break helps thermally insulate the glass gob G and minimizes heat loss from the gob G to the chute 22. In addition to establishing the gas cushion 50, the flow of the permeating gas through the chute 22 may function to cool and help regulate the temperature of the chute 22.

The permeating gas flows permeably through the chute 22 from the fluid chamber 26. As such, as part of the method, the permeating gas may be supplied to the fluid chamber 26 from a permeating gas source and the pressure of the gas within the chamber 26 may be controlled. By controlling the pressure of the permeating gas in the fluid chamber 26, the permeable flow rate of the permeating gas through the chute 22 can be controlled; indeed, increasing the pressure in the fluid chamber 26 results in an increase permeable flow rate of the permeating gas through the chute 22 while decreasing the pressure results in a decrease in the permeable flow rate. The ability to control the permeable flow rate of the permeating gas through the chute 22 allows the capacity of the gas cushion 50 to displace the molten glass gob G away from the front surface 46 of the chute 22 to be adjusted and tailored to a particular application. For example, under certain circumstances, it may be desired to lift the glass gob G way from the front surface 46 as much as possible, while in other applications it may be desired to minimize the amount of lift so that the gob G remains tight to the front surface 46.

In some applications—namely, for example, when the molten glass gob delivery guide 20 is employed as the distributor scoop 12 or the gob deflector 16—the chute 22 includes a curved bend 12', 16' (FIG. 1) between the upstream end 42 and the downstream end 44 of the chute 22 as part of the curved portion of the scoop 12 or deflector 16. The rear wall 24 may have a similar corresponding curved bend behind the chute 22. In general, when a molten glass gob G is conveyed through such a curved bend, the opportunity for heat loss from the gob G is increased since the gob carries significant momentum into the bend and may impact the bend more forcibly as the gob is redirected through the bend as compared to when the gob is traveling in a straight path. The molten glass delivery guide 10 described herein is better able to preserve the heat content of the molten glass gob G, as compared to traditional delivery equipment, because the gas cushion 50 established within the curved bend 12', 16' can lessen the impact or even prevent impact altogether between the glass gob G and the front surface 46 of the chute 22 within the curved bend 12', 16' as the gob travels therethrough. Also, within the curved bend 12', 16', the gas cushion 50 helps inhibit the glass gob G from sticking to the front surface 46 of the chute 22 and reduces wear on the front surface 46.

Another method of using the guide 20 to convey the molten glass gob G includes forming the glass gob G at the glass feeder F, receiving the glass gob G on a molten glass gob delivery track 10 that establishes a gob travel path from the glass feeder F to the blank mold B, conveying the glass gob G along the track 10 to the blank mold B of a glass container forming machine, and delivering the glass gob G from the track 10 and into the blank mold B. The molten glass gob delivery track 10 in this method includes the molten glass gob delivery guide 20. At the guide 20, the molten glass gob G is received onto the chute 22 within the open channel 36 at the upstream 42 of the chute 22 and travels or is conveyed along the guide 20 over the front surface 46 of the chute 22 from the upstream end 42 towards and to the downstream end 44 of the chute 22. The chute 22 is comprised of a gas permeable material and a permeating gas is supplied to the rear surface 48 of the chute 22. The permeating gas flows permeably through the chute 22 from the rear surface 48 to the front surface 46 and creates the gas cushion 50, which, as explained above, displaces the molten glass gob G away from the front surface 46. The permeating gas may be supplied to the rear surface 48 of the chute 22 by supplying the gas to the fluid chamber 26 and, as explained above, the pressure of the permeating gas in the fluid chamber 26 may be controlled to control the permeable flow rate of the permeating gas through the chute 22, thus allowing the strength of the gas cushion 50 to be adjusted as needed. In one embodiment, to support the permeable flow of the permeating gas through the chute 22, the gas permeable material may have a permeability of at least 50 md and, more preferably, at least 100 md or at least 120 md.

The subject matter of this application is presently disclosed in conjunction with several explicit illustrative embodiments and modifications to those embodiments. All terms used herein are intended to be merely descriptive, rather than necessarily limiting, and are to be interpreted and construed in accordance with their ordinary and customary meaning in the art, unless used in a context that requires a different interpretation. And for the sake of expedience, each explicit illustrative embodiment and modification is hereby incorporated by reference into one or more of the other explicit illustrative embodiments and modifications. As such, many other embodiments, modifications, and equivalents thereto will readily be suggested to persons of ordinary skill in the art in view of the present disclosure and all such variations, even though not necessarily explicitly disclosed, that fall within the scope of the accompanying claims are intended to be embraced by the present disclosure.

The invention claimed is:

1. A molten glass gob delivery guide comprising:
a chute and a rear wall coupled to the chute to define a fluid chamber between the chute and the rear wall, the chute having an upstream end, a downstream end spaced apart from the upstream end, a rear surface, and a front surface, and wherein the chute is comprised of a gas permeable material that is thermally conductive and has a permeability of at least 50 md and a melting point of at least 400° C., wherein the gas permeable material comprises a graphite-based material, a boron-nitride based material, or an additive manufactured metal having a density less than 100% of the theoretical density of the metal.

2. The molten glass gob delivery guide set forth in claim 1, wherein the permeability of the gas permeable material is 200 md to 600 md.

3. The molten glass gob delivery guide set forth in claim 1, wherein the chute is comprised entirely of graphite.

4. The molten glass gob delivery guide set forth in claim 3, wherein the chute is comprised entirely of extruded graphite.

5. The molten glass gob delivery guide set forth in claim 1, wherein the rear surface of the chute is partially encapsulated by the rear wall.

6. A molten glass gob delivery guide comprising:
a chute and a rear wall coupled to the chute to define a fluid chamber between the chute and the rear wall, the chute having an upstream end, a downstream end spaced apart from the upstream end, a rear surface, and a front surface, and wherein the chute is comprised of a gas permeable graphite-based material, boron-nitride based material, or additive manufactured metal having a density less than 100% of the theoretical density of the metal, and that has a permeability of at least 50.

7. The molten glass gob delivery guide set forth in claim 6, wherein the permeability of the graphite-based material is 200 md to 600 md.

8. The molten glass gob delivery guide set forth in claim 6, wherein the graphite-based material is extruded graphite.

9. The molten glass gob delivery guide set forth in claim 6, wherein the rear surface of the chute is partially encapsulated by the rear wall.

10. A method of conveying a molten glass gob, the method comprising:
receiving a molten glass gob on a front surface of a chute extending between an upstream end and a downstream end of the chute;
conveying the molten glass gob along the chute within an open channel defined by the chute; and
flowing a permeating gas permeably through the chute to create a gas cushion that displaces the molten glass gob away from the chute as the molten glass gob is being conveyed along the chute from the upstream end towards the downstream end of the chute, wherein the chute is comprised of a gas permeable material that is thermally conductive and has a permeability of at least 50 md and a melting point of at least 400° C., wherein the gas permeable material comprises a graphite-based material, a boron-nitride based material, or an additive manufactured metal having a density less than 100% of the theoretical density of the metal.

11. The method set forth in claim 10, wherein the gas permeable material is a graphite.

12. The method set forth in claim 10, further comprising:
supplying the permeating gas to a fluid chamber defined by the chute and a rear wall coupled to the chute.

13. The method set forth in claim 12, further comprising:
controlling a rate at which the permeating gas flows permeably through the chute by controlling a pressure of the permeating gas in the fluid chamber.

14. A method of delivering a molten glass gob, the method comprising:
forming a molten glass gob;
receiving the molten glass gob on a molten glass gob delivery track that establishes a gob travel path to a blank mold of a glass container forming machine, the molten glass gob delivery track including a molten glass gob delivery guide having a chute, the chute defining an open channel and including a front surface and a rear surface;
conveying the molten glass gob along the track to the blank mold, and, wherein, when the molten glass gob is conveyed along the molten glass gob delivery guide, the molten glass gob is received onto the chute within the open channel and is conveyed along the guide over the front surface of the chute; and supplying a permeating gas to the rear surface of the chute, the permeating gas flowing permeably through the chute from the rear surface to the front surface and creating a gas cushion that displaces the molten glass gob away from the front surface of the chute, wherein the chute is comprised of a gas permeable material that is thermally conductive and has a permeability of at least 50 md and a melting point of at least 400° C. and comprises a graphite-based material, a boron-nitride based material, or an additive manufactured metal having a density less than 100% of the theoretical density of the metal.

15. The method set forth in claim 14, further comprising: controlling a rate at which the permeating gas flows permeably through the chute by controlling a pressure of the permeating gas in a fluid chamber between a rear wall and a rear surface of the chute.

16. The method set forth in claim 14, wherein suppling the permeating gas to the rear surface of the chute comprises supplying the permeating gas to a fluid chamber defined by the chute and a rear wall coupled to the chute, the permeating gas in the fluid chamber being pressurized to a pressure ranging from 1 psig to 100 psig.

\* \* \* \* \*